（12）United States Patent
Tardy et al.

(10) Patent No.: US 12,011,887 B2
(45) Date of Patent: Jun. 18, 2024

(54) SYSTEMS AND METHODS FOR THERMOPLASTIC PANEL MANUFACTURING

(71) Applicant: ROHR, INC., Chula Vista, CA (US)

(72) Inventors: Shawn Tardy, Menifee, CA (US); Noushin Bahramshahi, Mission Viejo, CA (US); Andrew Adan, Corona, CA (US); Roberto Ramos, Moreno Valley, CA (US); Nicole M. Sannes, Chula Viista, CA (US)

(73) Assignee: ROHR, INC., Chula Vista, CA (US)

( * ) Notice: Subject to any disclaimer, the term of this patent is extended or adjusted under 35 U.S.C. 154(b) by 42 days.

(21) Appl. No.: 17/554,775

(22) Filed: Dec. 17, 2021

(65) Prior Publication Data

US 2023/0191722 A1  Jun. 22, 2023

(51) Int. Cl.
*B29C 70/44* (2006.01)
*B29C 65/00* (2006.01)
*B29C 70/54* (2006.01)
*B29L 7/00* (2006.01)

(52) U.S. Cl.
CPC ........ *B29C 70/443* (2013.01); *B29C 66/0044* (2013.01); *B29C 66/7392* (2013.01); *B29C 66/81455* (2013.01); *B29C 66/91411* (2013.01); *B29C 70/549* (2021.05); *B29L 2007/002* (2013.01)

(58) Field of Classification Search
CPC ..... B29C 70/44; B29C 70/443; B29C 70/549; B29C 66/0044; B29C 66/7392; B29C 66/81455; B29C 66/91411
See application file for complete search history.

(56) References Cited

U.S. PATENT DOCUMENTS

| 4,765,942 | A | 8/1988 | Christensen et al. |
| 5,236,646 | A * | 8/1993 | Cochran ................. B29C 70/44 |
| | | | 156/286 |
| 5,968,445 | A | 10/1999 | McCarville et al. |
| 6,761,783 | B2 | 7/2004 | Keller et al. |
| 9,243,407 | B2 | 1/2016 | Zhao et al. |
| 10,239,300 | B2 | 3/2019 | Joslyn et al. |
| 10,309,695 | B2 | 6/2019 | Oakes |
| 10,456,961 | B2 | 10/2019 | Terasaka et al. |

(Continued)

FOREIGN PATENT DOCUMENTS

| DE | 102004062064 A1 * | 7/2006 | ......... B29C 35/0288 |
| WO | WO-2014195799 A2 * | 12/2014 | ............. B29C 70/44 |
| WO | 2021083712 | 5/2021 | |

OTHER PUBLICATIONS

DE 102004062064A-Machine Translation (Year: 2006).*

(Continued)

*Primary Examiner* — Yunju Kim
(74) *Attorney, Agent, or Firm* — SNELL & WILMER L.L.P.

(57) ABSTRACT

A method of manufacturing a thermoplastic panel may comprise: laying up a panel preform within a consolidation assembly, the panel preform comprising a plurality of plies of material comprising thermoplastic resin and fiber; generating, via a hot bond unit, a vacuum environment within the consolidation assembly; and heating, via the hot bond unit and through a heated blanket within the consolidation assembly, the panel preform.

9 Claims, 5 Drawing Sheets

(56) References Cited

U.S. PATENT DOCUMENTS

| | | |
|---|---|---|
| 10,589,477 B2 | 3/2020 | Huang et al. |
| 2009/0165945 A1* | 7/2009 | Molligan ............ B29C 51/004 425/405.2 |
| 2013/0143006 A1 | 6/2013 | Ferguson |
| 2021/0237381 A1 | 8/2021 | Hafenrichter et al. |

OTHER PUBLICATIONS

European Patent Office, European Search Report dated Sep. 21, 2023 in Application No. 22212650.0.
European Patent Office, European Partial Search Report dated May 5, 2023 in Application No. 22212650.0.

* cited by examiner

SYSTEMS AND METHODS FOR THERMOPLASTIC PANEL MANUFACTURING

FIELD

The present disclosure relates generally to thermoplastics manufacturing, and more specifically to hot bonding consolidation for manufacturing thermoplastic panels.

BACKGROUND

Various industries include components having panels for various uses. For example, the aerospace industry utilizes nacelles for various applications for providing a protective housing around adjacent components as well as for providing an aerodynamic surface for reducing drag, among other applications. For example, a fan cowl is used for covering various components of a turbine engine and provides an aerodynamic surface for the turbine engine and related systems. A fan cowl outer skin is typically made from metal or carbon fiber thermoplastic composites. Other aircraft components, large and small, may be manufactured from thermoplastic materials.

SUMMARY

A method of manufacturing a thermoplastic panel is disclosed herein. The method may comprising: tacking together a plurality of plies of material comprising thermoplastic resin and fiber to form a preform; laying up the preform on a layup surface of an invar mold; at least partially enclosing the preform within a breather frame; laying up a caul plate, the preform disposed between the caul plate and the invar mold; laying up a heated blanket on the caul plate; enclosing the preform within a vacuum bag and the invar mold; generating a vacuum environment between the invar mold and the vacuum bag; and heating the heated blanket to a first cure temperature.

In various embodiments, the vacuum environment is generated from a hot bonder system. The heated blanket may be heated via the hot bonder system.

In various embodiments, the method further comprises laying up a release agent on the layup surface of the invar mold prior to laying up the preform on the layup surface of the invar mold. The method may further comprise laying up a release film on a mating surface of the preform, the mating surface opposite a second mating surface in contact with the release agent. The method may further comprise laying up a breather bag on the heated blanket prior to enclosing the preform within the vacuum bag and the invar mold. The method may further comprise forming the thermoplastic panel in response to heating the thermoplastic panel. The method may further comprise cooling the thermoplastic panel.

A method of manufacturing a thermoplastic panel is disclosed herein. The method may comprise: laying up a panel preform within a consolidation assembly, the panel preform comprising a plurality of plies of material comprising thermoplastic resin and fiber; generating, via a hot bond unit, a vacuum environment within the consolidation assembly; and heating, via the hot bond unit and through a heated blanket within the consolidation assembly, the panel preform.

In various embodiments, the consolidation assembly comprises an invar mold and a caul plate, the panel preform disposed between the invar mold and the caul plate. The consolidation assembly may comprise an ultra-high temperature (UHT) breather frame, the panel preform disposed within an opening of the UHT breather frame. The consolidation assembly may comprise a release agent disposed between a first mating surface of the panel preform and a layup surface of the invar mold. The consolidation assembly may comprises a release film disposed between a second mating surface of the panel preform and the caul plate, the second mating surface opposite the first mating surface.

In various embodiments, the heating further comprises heating from a first temperature to a first cure temperature. A rate of heating from the first temperature to the first cure temperature may be between 10° F. (5.6° C.) and 20° F. (11.2° C.) per minute, and the first cure temperature may be between 500° F. (260° C.) and 600° F. (316° C.). The heating may further comprise heating from the first cure temperature to a second cure temperature after a first time period. The second cure temperature may be between 600° F. (316° C.) and 800° F. (427° C.), and the first time period is between 5 minutes and 60 minutes.

A method of manufacturing a thermoplastic panel is disclosed herein. The method may comprise: placing a panel preform comprising a plurality of plies of material comprising thermoplastic resin and fiber under a vacuum environment; heating, via a hot bond system, the panel preform from a first temperature to a first cure temperature at a first rate, the first rate being between 10° F. (5.6° C.) and 20° F. (11.2° C.) per minute; and heating, via the hot bond system, the panel preform at the first cure temperature, the first cure temperature being between 500° F. (260° C.) and 800° F. (427° C.).

In various embodiments, the first cure temperature is between 500° F. (260° C.) and 600° F. (316° C.). The method may further comprise heating, via the hot bond system, the panel preform from the first cure temperature to a second cure temperature between 600° F. (316° C.) and 800° F. (427° C.); and cooling the panel preform.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein refers to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

The thermoplastic panel manufacturing process, as described herein, may provide a relatively quick manufacturing process, e.g., approximately half of a cure duration of a typical thermoplastic panel manufacturing process, of a thermoplastic panel, such as the outer skin for a stiffened panel. The thermoplastic panel manufacturing process, as described herein, may provide an efficient, straightforward, manufacturing process for producing a flat thermoplastic panel, a contoured thermoplastic panel, or the like.

Figure 1A:
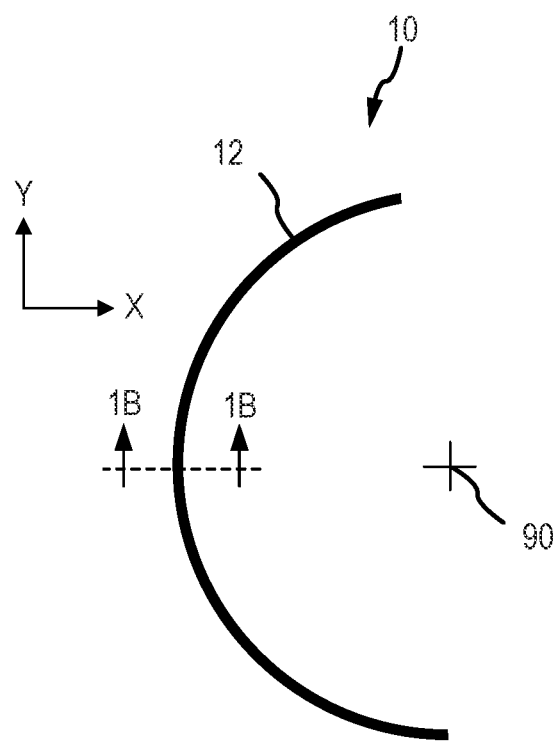
FIG. 1A illustrates a front-view profile of a stiffened panel half (such as for an aircraft nacelle fan cowl) having a semi-cylindrical geometry, in accordance with various embodiments.

With reference to FIG. 1A, a stiffened panel half 10 is illustrated, in accordance with various embodiments. Stiffened panel half 10 may comprise an outer skin 12. Outer skin 12 may comprise a semi-cylindrical geometry when viewed from the aft direction, as shown in the illustrated embodiment. Outer skin 12 may define a centerline axis 90. Stated differently, outer skin 12 may be bent around centerline axis 90.

Figure 1B:
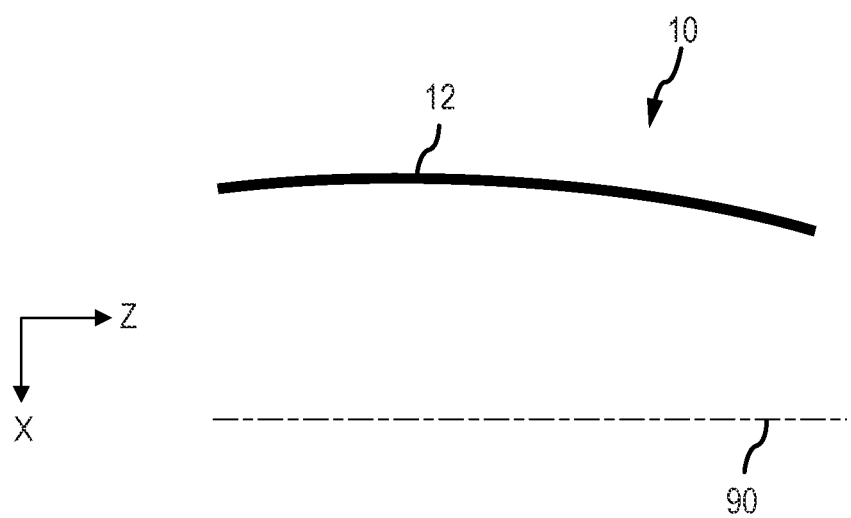
FIG. 1B illustrates a section view of the panel half of FIG. 1A having a rounded geometry, in accordance with various embodiments.

With reference to FIG. 1B, a section view of stiffened panel half 10 is illustrated, in accordance with various embodiments. Outer skin 12 may be contoured along the longitudinal direction (i.e., the Z-direction). Stated differently, outer skin 12 may comprise a non-linear geometry (e.g., rounded) along the longitudinal direction.

Outer skin 12 may be made from a fiber-reinforced thermoplastic material. In various embodiments, the outer skin 12 comprises a continuous reinforcing fiber and a thermoplastic resin. The reinforcing fiber to be used for the outer skin 12 has no particular limitations with respect to the type thereof, and examples thereof include metal fibers, such as an aluminum fiber, a brass fiber, and a stainless steel fiber, carbon fibers (including graphite fibers), such as polyacrylonitrile (PAN)-based carbon fibers, rayon-based carbon fibers, lignin-based carbon fibers, and pitch-based carbon fibers, insulating fibers, such as glass fiber, organic fibers, such as aramid fibers, polyparaphenylene benzoxazole (PBO) fibers, polyphenylene sulfide fibers, polyester fibers, acrylic fibers, nylon fibers, and polyethylene fibers, and inorganic fibers, such as silicon carbide fibers and silicon nitride fibers. Fibers prepared by applying surface treatment to these fibers are also available. Examples of the surface treatment include treatment with a coupling agent, treatment with a sizing agent, treatment with a binder, and adhesion treatment with an additive in addition to deposition treatment with conductive metal.

In the disclosure, the thermoplastic resin to be used for the outer skin 110 may be either crystalline or amorphous.

Examples of the crystalline thermoplastic resin include polyester, polyolefin, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include polyethylene terephthalate (PET), polybutylene terephthalate (PBT), polytrimethylene terphthalate (PTT), polyethylene naphthalate (PEN), and liquid crystal polyester. Examples of the polyolefin include polyethylene (PE), polypropylene (PP), and polybutylene. Examples of the polyarylene sulfide include polyphenylene sulfide (PPS). Examples of the fluororesin include polytetrafluoroethylene.

Examples of the amorphous thermoplastic resin include polystyrene, polycarbonate (PC), polymethyl methacrylate (PMMA), polyvinyl chloride (PVC), polyphenylene ether (PPE), polyimide (PI), polyamide imide (PAD, polyetherimide (PEI), polysulfone (PSU), polyether sulfone (PES), and polyarylate (PAR). The thermoplastic resin to be used for the outer skin 110 also may be phenoxy resin, polystyrene, polyolefin, polyurethane, polyester, polyamide, polybutadiene, polyisoprene, fluorine resin, acrylonitrile, and other thermoplastic elastomers, and copolymers and modified resin thereof.

Although described herein with respect to a stiffened panel and an outer skin, and a fiber-reinforced thermoplastic material, the present disclosure is not limited in this regard. For example, a thermoplastic panel, flat or countered, made of a thermoplastic material comprising only a thermoplastic resin is within the scope of this disclosure. In various embodiments, the thermoplastic material is made of a crystalline thermoplastic resin.

Figure 2:
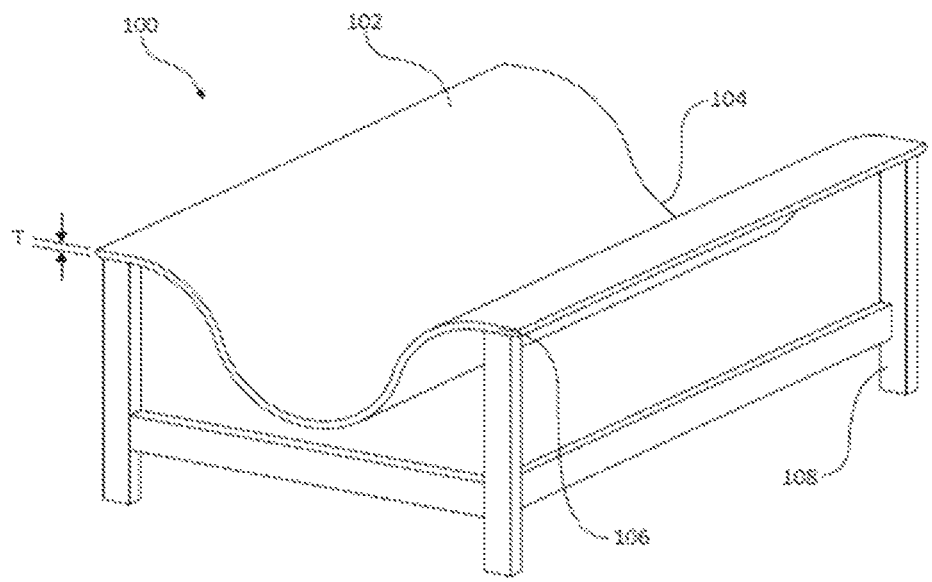
FIG. 2 illustrates a perspective view of a invar mold, in accordance with various embodiments FIG. 3 provides a flow chart for a method for manufacturing a fiber-reinforced thermoplastic panel, in accordance with various embodiments.

With reference to FIG. 2, a bonding tool 100 with an invar mold 102 having layup surface 104 is shown, in accordance with various embodiments. Invar mold 102 may include a layup surface 104 with a contour in the shape of a part to be produced. Although illustrated as having a contoured shape, a flat shape is also within the scope of this disclosure. Supports 108 may provide support for bonding tool 100. Invar mold 102 may have a sidewall 106 of thickness T. Invar mold 102 may have a substantially uniform thickness such that the thickness of invar mold 102 at any point may be approximately equal to thickness T. Thickness T may be a thickness from one half inch (1.3 cm) to six inches (15.2 cm). For example, thickness T may be approximately one inch (2.5 cm).

Figure 3:
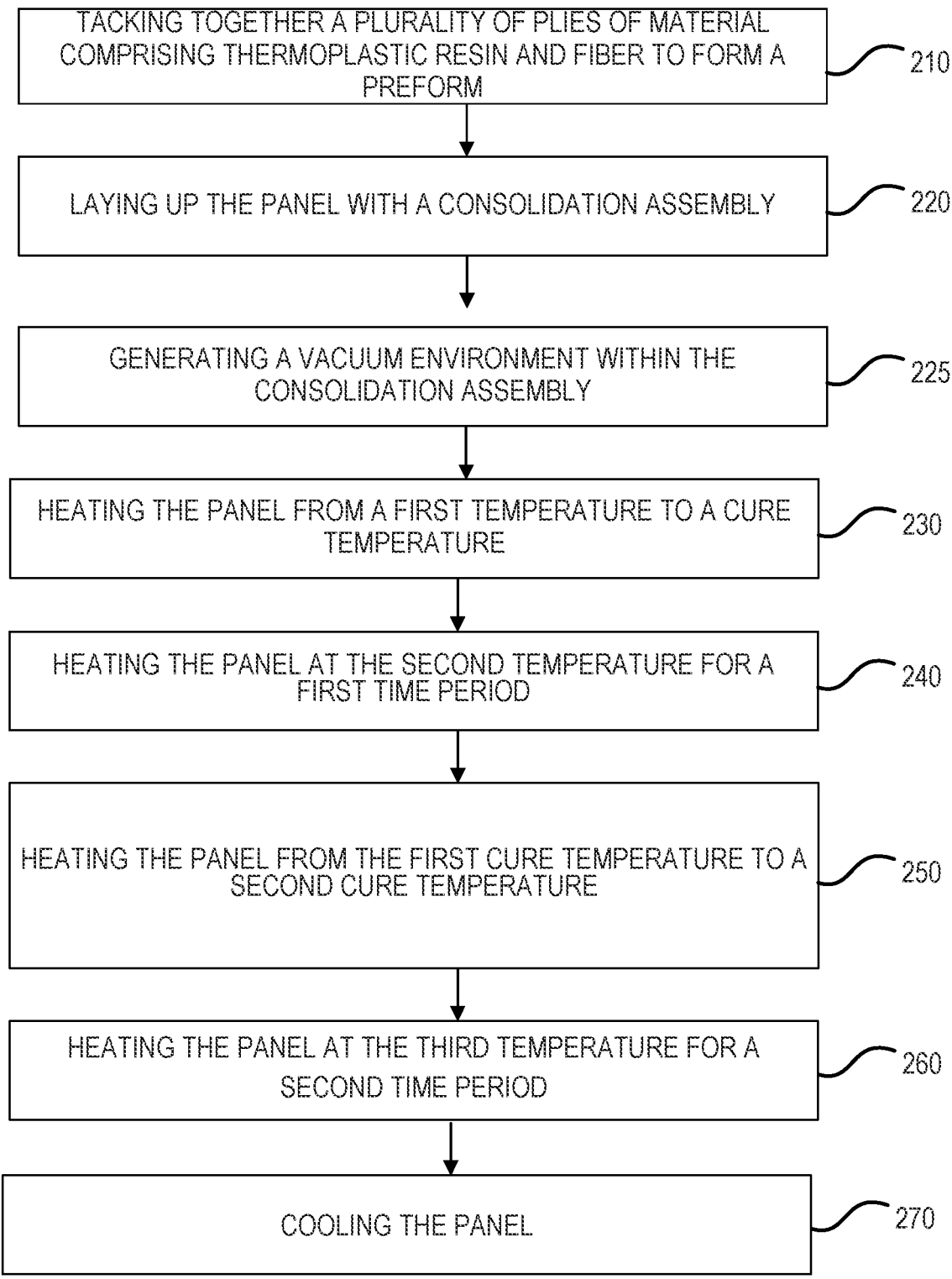

With reference to FIG. 3, a method 200 for manufacturing a thermoplastic panel is provided, in accordance with various embodiments. Method 200 includes tacking together a plurality of plies of material comprising thermoplastic resin and fiber to form a panel (step 210). Method 200 includes laying up the panel with a consolidation assembly (step 220).

Method 200 includes generating a vacuum environment within the consolidation assembly (step 225). Method 200 includes heating the panel from a first temperature (e.g., between 0° F. (−18° C.) and 100° F. (38° C.)) to a first cure temperature (step 230). Stated another way, the method 200 may comprise applying heat for a first time period to take the temperature from the first temperature to the first cure temperature. In various embodiments, the first cure temperature may be between 500° F. (260° C.) and 600° F. (316° C.), or approximately 545° F. In various embodiments a rate of temperature increase of step 230 may be between 10° F. (5.6° C.) and 20° F. (11.2° C.) per minute, or approximately 15° F. (8.3° C.). Method 200 includes heating the panel at the second temperature for a first time period (e.g., a first dwell period) (step 240). The first time period may be between 5 minutes and 60 minutes, or approximately 30 minutes. Method 200 includes heating the panel from the first cure temperature to a second cure temperature (step 250). The second cure temperature may be between 600° F. (316° C.) and 800° F. (427° C.), or approximately 715° F. (316° C.). Method 200 includes heating the panel at the second cure temperature for a second time period (e.g., a second dwell period) (step 260). The second time period may be between 5 minutes and 60 minutes, or approximately 30 minutes. Method 200 includes cooling the panel (step 270). Cooling the panel may be by exposing the panel to ambient conditions, or active cooling. The present disclosure is not limited in this regard. In various embodiments, steps 230-270 are all performed within the consolidation assembly as described further herein. In various embodiments, method 200 may be faster and less expensive relative to typical thermoplastic panel manufacturing processes, such as curing via an oven or the like. In various embodiments, the method 200 may facilitate manufacturing of smaller thermoplastic, panels or components, that can be utilized in repairs or the like.

Figure 4:
FIG. 4 illustrates a step from the method of FIG. 3, in accordance with various embodiments.

With combined reference to FIG. 3 and FIG. 4, step 210 may include stacking plies of fiber sheets 301 and thermoplastic resin sheets 302 to a desired thickness to form a panel preform 310 (also referred to herein as a preform). In various embodiments, and for ease of handling, the sheets 301, 302 may be stacked on a substantially planar surface 305. In various embodiments, with brief reference to FIG. 5, the sheets 301, 302 may be stacked during laying up of the consolidation assembly 400 on an invar mold 405. The present disclosure is not limited in this regard. In various embodiments, the resin sheets 302 may be "tacky" at a room temperature. Therefore, the resin sheets 302 may be "tacked" or stick to adjacent fiber sheets 301 without adding additional heat. However, in various embodiments, local heat may be applied to tack the resin sheets 302 and fiber sheets 301 together to form a flat sheet of material. Various methods may be used to tack together the stack of sheets to hold the sheets in place with respect to each other without departing from the scope of the present disclosure, such as clamping and ultrasonic welding, among others. Furthermore, any number of plies of fiber sheets 301 and/or resin sheets 302 may be used depending on the desired thickness of the fiber-reinforced thermoplastic panel. Furthermore, the thickness of the panel may vary. In this regard, a first location of the panel may have a first number of plies and a second location of the panel may have a second number of plies, different from the first number of plies. After the panel preform 310 has been formed, the panel preform 310 may be laid up on a consolidation assembly 400 (see FIG. 5).

Figure 5:
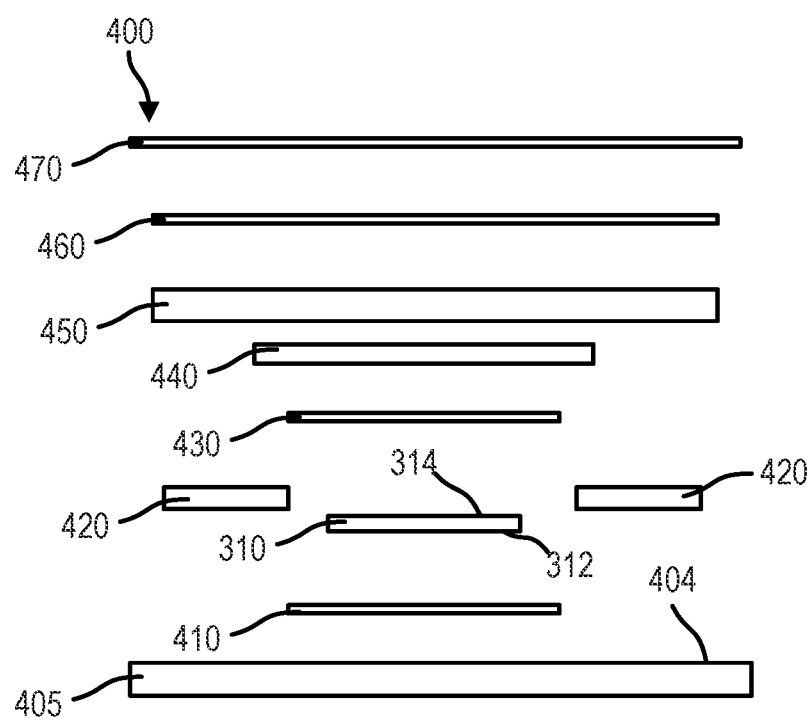
FIG. 5 illustrates a step from the method of FIG. 3, in accordance with various embodiments.

With combined reference to FIG. 3 and FIG. 5, step 220 may include laying up the panel preform 310 to form a consolidation assembly 400 (step 220). In this manner, the consolidation assembly 400 includes an invar mold 405. In various embodiments, the invar mold 405 may be in accordance with the invar mold 102 from FIG. 1. In various embodiments, the invar mold 405 may be substantially flat. "Substantially flat" as referred to herein includes a flatness (e.g., a variance from a reference plane) of less than 0.10 inches (0.25 cm), or less than 0.05 inches (0.13 cm), or less than 0.01 inches (0.025 cm). For the sake of brevity, the method 200 and stack up of the consolidation assembly 400 described herein will be described with respect to a square panel. However, the present disclosure is no way limited in this regard.

The consolidation assembly 400 may further comprise a release agent 410 (e.g., a solvent-based moisture-curing release epoxy such as that sold under the mark LOCTITE® Frekote 700NC). The release agent 410 may be disposed directly on the layup surface 404, followed by the panel preform 310. The release agent 410 may define a cross-sectional area that is greater than a cross sectional area of the panel preform 310 in the stack up. For example, if the panel preform 310 is a 12 inch (30.5 cm)×12 inch (30.5 cm) panel, the release agent 410 may cover a cross-sectional area of approximately 14 inches (36 cm)×14 inches (36 cm), in accordance with various embodiments. In this regard, an entire mating surface of the panel preform 310 may be in contact with the release agent 410, in accordance with various embodiments. For a contoured shape, the cross-sectional area referred to herein is through a cross-section along a plane defined through a thickness of a respective component. Stated another way, the cross-sectional area is a surface area of a mating surface, in accordance with various embodiments.

The consolidation assembly 400 further comprises an ultra-high temperature (UHT) breather frame 420. The UHT breather frame 420 may be enclose a perimeter of the panel preform 310 (e.g., the breather frame 420 may be disposed about an entirety of a perimeter of the panel preform 310). For example, if the panel preform 310 is a 12-inch (30.5 cm)×12-inch (30.5 cm) panel, the UHT breather frame 420 may define an opening with an cross-sectional area of approximately 14 inches (36 cm)×14 inches (36 cm). In various embodiments, the opening defined by the UHT breather frame 420 may be approximately equal to the cross-sectional area of the release agent 410. The present disclosure is not limited in this regard.

The UHT breather frame 420 may be any UHT breather frame, such as a non-woven blended, fiberglass breather sold under the trademark Airweave® which can be purchased from Airtech International, Inc. located in Huntington Beach CA. The UHT breather frame 420 may facilitate release of trapped air during the consolidation process defined in steps 230-270 from method 200. In various embodiments, the UHT breather frame 420 provides efficient breathing during the method 200 from FIG. 3 for temperatures up to and including 800° F. (430° C.).

In various embodiments, the consolidation assembly 400 further comprises a release film 430. During step 220 of method 200, the release film 430 is applied to a mating surface 314 of the panel preform 310. The mating surface 314 may be opposite a mating surface 312 in contact with the release agent 410. Thus, the panel preform 310 is disposed between (i.e., in a thickness direction) the release agent 410 and the release film 430. In various embodiments, the release agent 410 and the release film 430 may comprise the same material. In various embodiments, the release agent 410 and the release film 430 may be different materials. For example, the release film 430 may comprise a high-performance polymeric material, such as a polyimide material (e.g., sold under the name Thermalide RCBS which can be purchased from Airtech International, Inc. located in Huntington Beach CA).

In various embodiments, the consolidation assembly 400 further comprises a caul plate 440 disposed on top of the release film 430. In this regard, caul plate 440 and the invar mold 405 sandwich the panel preform 310 therebetween with release film 430 and release agent 410 preventing any contact between the invar mold 405 or the caul plate 440 and the panel preform 310, thus promoting an efficient consolidation process as outlined in steps 230-270 of method 200.

The consolidation assembly 400 further comprises a heated blanket 450. As described further herein, the heated blanket 450 may be coupled to a hot bond unit. The heated blanket 450 may supply the heat during consolidation as defined in steps 230-270 of method 200. The hot bond unit (e.g., hot bond unit 602 from FIG. 6) may be configured to heat up the heated blanket 450 and supply a vacuum within the consolidation assembly 400 as described further herein.

The consolidation assembly 400 further comprises a vacuum bag 470 including a high temperature vacuum bagging material (e.g., polyimide bagging film, nylon bagging film, polyethylene bagging film, elastomeric bagging film, etc.). The consolidation assembly further comprises a UHT breather 460 disposed between the heated blanket 450 and a vacuum bag 470. In various embodiments, the vacuum bagging material and the invar mold 405 fully encloses the remaining components of the consolidation assembly 400. In this regard, the vacuum bag 470 is configured to facilitate a vacuum environment within the consolidation assembly 400 during steps 230-270 of method 200 as described further herein.

Figure 6:
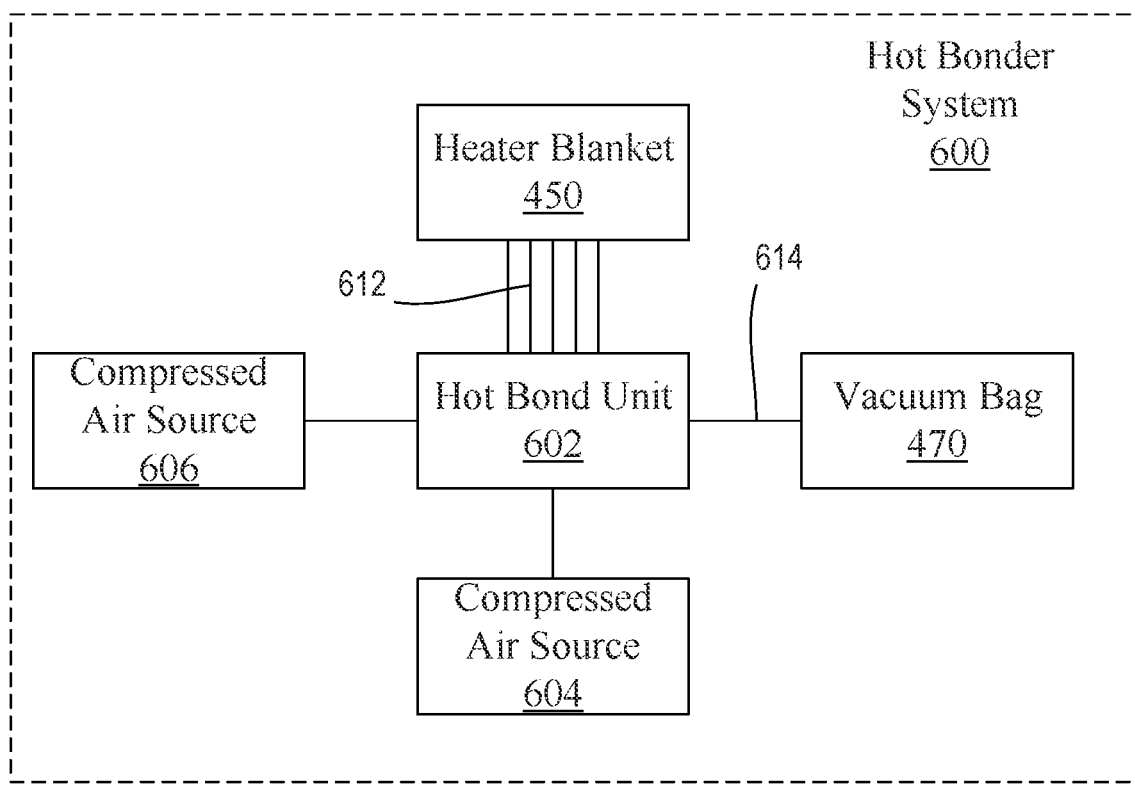
FIG. 6 illustrates a hot bonder system for use in the method from FIG. 3, in accordance with various embodiments.

Referring now to FIG. 6, a hot bonder system 600 for use with the consolidation assembly 400 is illustrated, in accordance with various embodiments. The hot bonder system 600 comprises a hot bond unit 602 in electrical communication with the heated blanket 450 (e.g., via thermocouples 612) and in fluid communication with the vacuum bag 470. The hot bond unit 602 is configured to heat the heated blanket 450 via the thermocouples 612 from power supplied by the power source 604. Additionally, the hot bond unit 602 is configured to create a vacuum environment within the vacuum bag 470 of the consolidation assembly 400 from FIG. 5 via compressed air source 604 creating a vacuum in the vacuum fluid line 614.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a thermoplastic panel, the method comprising:

tacking together a plurality of plies of material comprising thermoplastic resin and fiber to form a preform;

disposing a release agent on a layup surface of an invar mold, the release agent comprising a solvent-based moisture curing release epoxy; subsequently laying up the preform on the release agent;

at least partially enclosing the preform within a breather frame;

laying up a caul plate, the preform disposed between the caul plate and the invar mold;

laying up a heated blanket of a hot bonder system on the caul plate;

laying up a breather on the heated blanket, the heated blanket disposed between the caul plate and the breather;

enclosing the preform within a vacuum bag and the invar mold to form a consolidation assembly, the vacuum bag and the invar mold fully enclosing the breather frame, the caul plate, the preform, and the heated blanket;

generating, via the hot bonder system, a vacuum environment between the invar mold and the vacuum bag; and curing, via a curing step, the preform to form the thermoplastic panel, the curing step including:

heating, via the hot bonder system, the heated blanket to a first cure temperature, wherein the first cure temperature is between 500° F. (260° C.) and 600° F. (316° C.);

dwelling, via the hot bonder system, at the first cure temperature for a first time period, wherein the first dwell period is between 5 minutes and 60 minutes;

heating, via the hot bonder system, from the first cure temperature to a second cure temperature after the first time period, wherein the second cure temperature is between 600° F. (316° C.) and 800° F. (427° C.), wherein the second cure temperature is greater than the first cure temperature; and dwelling, via the hot bonder system, at the second cure temperature for a second dwell period, wherein the second dwell period is between 5 minutes and 60 minutes.

2. The method of manufacturing of claim 1, further comprising laying up a release film on a mating surface of the preform, the mating surface opposite a second mating surface in contact with the release agent.

3. The method of claim 1, further comprising forming the thermoplastic panel in response to heating the thermoplastic panel.

4. The method of claim 3, further comprising cooling the thermoplastic panel.

5. A method of manufacturing a thermoplastic panel, the method comprising:

stacking plies of fiber sheets and plies of thermoplastic resin sheets to a thickness;

tacking together the plies of fiber sheets and the plies of thermoplastic resin sheets to from a panel preform;

laying up the panel preform within a consolidation assembly, the consolidation assembly including a mold, a plate, a heated blanket, and a breather, the panel preform disposed between the mold and the plate, the heated blanket disposed between the plate and the breather, the breather disposed between the plate and a vacuum bag, the consolidation assembly fully enclosing the plate, the heated blanket, the breather, and the panel preform between the mold and the vacuum bag, wherein the consolidation assembly comprises a release agent disposed between a first mating surface of the panel preform and a layup surface of the mold, the release agent comprising a solvent-based moisture curing release epoxy;

generating, via a hot bond unit, a vacuum environment within the consolidation assembly; and curing, a curing step, the panel preform by heating, via the hot bond unit and through the heated blanket within the consolidation assembly, the panel preform, wherein the curing step comprises:

heating from a first temperature to a first cure temperature, wherein the first cure temperature is between 500° F. (260° C.) and 600° F. (316° C.);

dwelling, via the hot bond unit, at the first cure temperature for a first time period, wherein the first time period is between 5 minutes and 60 minutes;

heating from the first cure temperature to a second cure temperature after a first time period, wherein the second cure temperature is between 600° F. (316° C.) and 800° F. (427° C.), wherein the second cure temperature is greater than the first cure temperature; and dwelling, via the hot bond unit, at the second cure temperature for a second dwell period, wherein the second time period is between 5 minutes and 60 minutes.

6. The method of manufacturing of claim 5, wherein the consolidation assembly comprises an ultra-high temperature (UHT) breather frame, the panel preform disposed within an opening of the UHT breather frame.

7. The method of manufacturing of claim 6, wherein the consolidation assembly comprises a release film disposed between a second mating surface of the panel preform and the plate, the second mating surface opposite the first mating surface.

8. The method of manufacturing of claim 5, wherein a rate of heating from the first temperature to the first cure temperature is between 10° F. (5.6° C.) and 20° F. (11.2° C.) per minute.

9. A method of repairing an aircraft component, the method comprising:

performing the steps of the method of manufacturing the thermoplastic panel of claim 1 to form the thermoplastic panel; and repairing the aircraft component with the thermoplastic panel.

* * * * *